(No Model.) 2 Sheets—Sheet 2.
S. LAWSON.
VALVE FOR GAS ENGINES.
No. 433,246. Patented July 29, 1890.
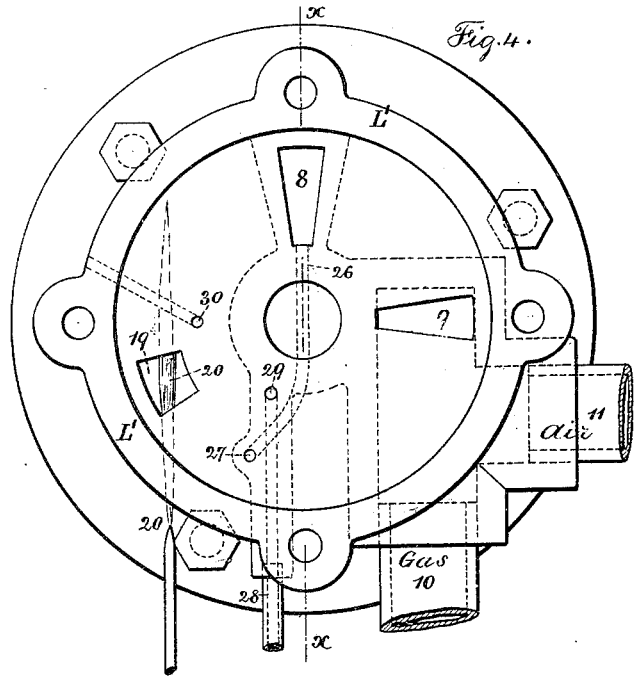
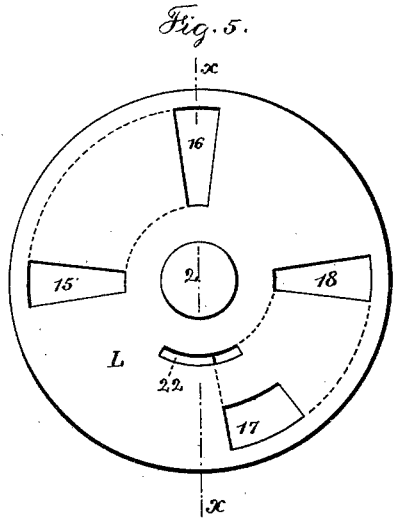
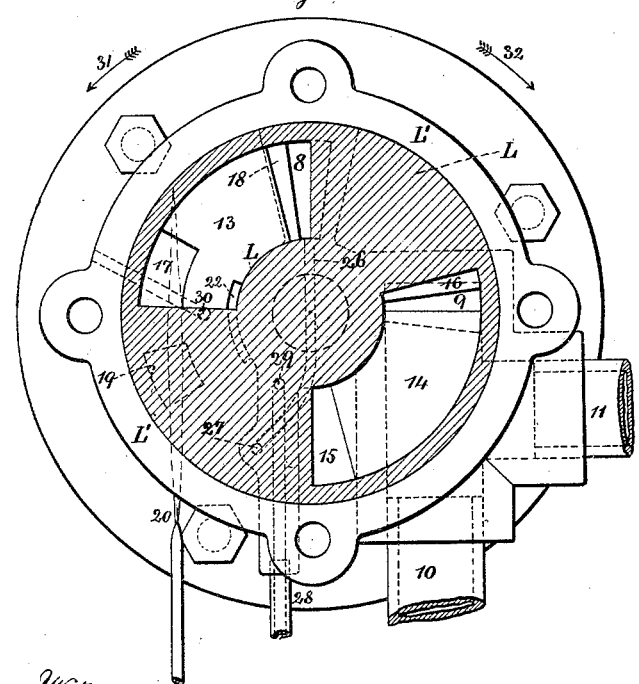
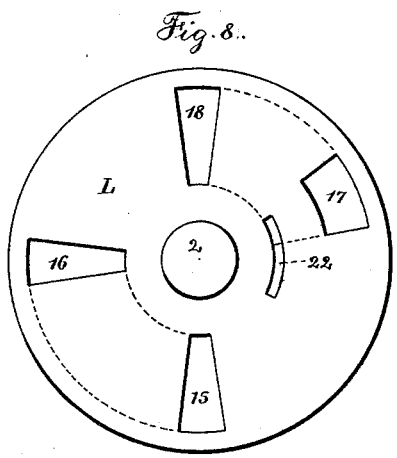
Witnesses:
J. Staib
Chas H. Smith
Inventor:
Samuel Lawson
per Lemuel W. Serrell
Atty.

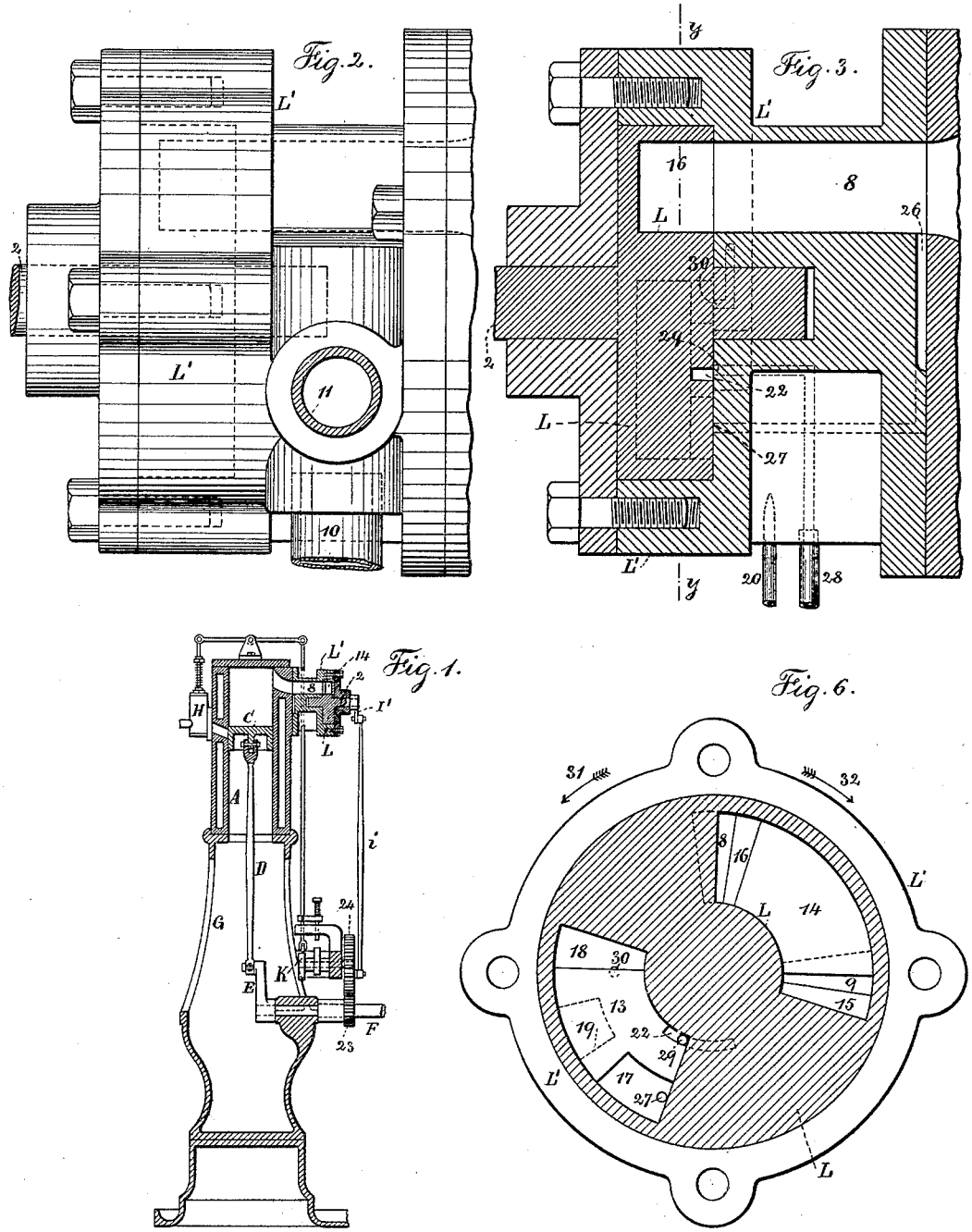

UNITED STATES PATENT OFFICE.

SAMUEL LAWSON, OF NEW YORK, N. Y., ASSIGNOR TO HIMSELF AND ALONZO T. WELCH, OF SAME PLACE.

VALVE FOR GAS-ENGINES.

SPECIFICATION forming part of Letters Patent No. 433,246, dated July 29, 1890.

Application filed January 4, 1890. Serial No. 335,893. (No model.)

*To all whom it may concern:*

Be it known that I, SAMUEL LAWSON, a citizen of the United States, residing at the city and State of New York, have invented an Improvement in Valves for Gas-Engines, of which the following is a specification.

This valve is especially adapted to gas-engines of a character similar to that represented in my patent, No. 402,751, granted May 7, 1889, and in which there is a piston reciprocated within a cylinder and acting upon a connecting-rod and crank to revolve a fly-wheel, and into which the air and gas are drawn upon the downward movement of the piston. The supply is shut off as the piston rises, and the ignition of the air and gas takes place as soon as the crank turns its center upon the upstroke, so as to act forcibly upon the parts in accelerating the movement of the piston and fly-wheel upon the second downstroke, and upon the second upstroke the spent gases are forced out, and upon the second downstroke the air and gases are drawn in again and the operations repeated as before.

I make use of a peculiar circular valve to which a reciprocating movement is given, first in one direction and then in the other, to admit the air and gas to the engine-cylinder and to admit air and gas into the igniting-chamber in the valve, so that at the proper moment, when the crank has turned the center on the upstroke, the ignited gases in the chamber of the valve will ignite the gases in the cylinder of the engine to insure a perfect explosion in such cylinder.

In the drawings, Figure 1 is a diagram representing the engine and connections for moving the valve. Fig. 2 is an elevation of the valve-chest. Fig. 3 is a vertical section of the same at the line $x$ $x$ of Figs. 4 and 5. Fig. 4 is an elevation of the valve-chest with the valve removed. Fig. 5 is an elevation of the face of the valve as the same would appear if turned over from the position it would occupy when inserted into the valve-case. Fig. 6 is a section of the valve and case at the line $y$ $y$, Fig. 3. Fig. 7 is an elevation of the valve-case and a section of the valve in the position it occupies when the explosion takes place, and Fig. 8 shows the face of the valve nearly in the position corresponding to Fig. 7.

Referring to Fig. 1 and to my before-mentioned patent, the cylinder A is represented as supported by a suitable base or frame G, and the piston C is within the cylinder A and provided with a connecting-rod D to the crank E of the main shaft F, and upon this main shaft F is a pinion 23, gearing into a wheel 24 of twice the diameter, and there is a cam at K, that serves to open and close the exhaust valve or slide at H at the proper time, and there is a connecting-rod $i$ from a crank-pin on the gear-wheel 24, that gives motion to the valve L.

In my present improvements, however, the valve is circular and oscillated by the action of the connecting-rod $i$ upon the arm I', that extends out from the arbor or axis 2 of the valve L, which valve L is circular and is within a valve-case L', and in consequence of the wheel 24 making one revolution to two revolutions of the shaft F the valve L receives a complete movement, first in one direction and then in the other, every two strokes of the piston C. This valve-case L' has a port 8 to the cylinder A, and it has a port 9, through which air and gas are drawn at the proper time from the pipe 10, supplying gas, and the pipe 11, supplying air. These commingle as they pass through the port 9 into the valve and from there into the cylinder A, as hereinafter described.

The valve L is cylindrical and partially hollow, having two chambers 13 and 14 therein, and there are two ports 15 16 to the chamber 14, and there are two ports 17 18 to the chamber 13, and adjacent to the port 18 there is a port 19 through the valve-case L', adjacent to the gas-burner or other flame at 20, and in the valve L is a segmental port 22, opening into the chamber 13, and in the valve-case there is a hole or port 26 from the port 8, passing down and terminating at the opening 27 in the valve-seat, and there is a gas-pipe 28 with a tubular passage terminating at the opening 29 in the valve-seat, and there is a tubular passage from the outside to the opening 30 in the valve-seat to let in air, as hereinafter described.

Commencing now with the parts in the position represented in Fig. 6 and presuming that the piston C is descending, the air and gas are drawn in through the ports 9 and 15, through the chamber 14, and by the ports 16 and 8 to the cylinder A, and the valve moves progressively in the direction of the arrow 31 until the port 16 coincides with the port 8, and then it commences to move in the opposite direction, indicated by the arrow 32. During this period the hole 30 and the port 18 coincide and the hole 29 and port 22 coincide, and the port 17 has uncovered the hole 27; hence the suction action of the descending piston causes any spent gases in the chamber 13 to be drawn out through the hole 27, that leads into the port 8, and at the same time gas is entering the chamber 13 by the opening 29 and air is entering the same chamber by the pipe 30, and this operation continues without any loss of gas, because the air and gas from the chamber 13 pass into the cylinder A, thus entirely freeing the chamber 13 from spent gases.

During the movement of the valve in the direction indicated by the arrow 32 the air-inlet 30 is first closed, (see Fig. 6,) and then the hole 27 is closed, and immediately thereafter the port 16 passes away from the port 8, closing the latter, and this operation takes place as the crank E turns its center, when the piston C is at its extreme downward movement and commences to rise, and in so doing the gases contained in the cylinder A are compressed, and during the upward movement of the piston C the valve L has been continuing its motion in the direction of the arrow 32 and gas has continued to flow in by the opening 29 and segmental port 22 into the chamber 13, and the further movement causes the port 17 of the valve to correspond to the port 19, and the gases in the chamber 13 are ignited by the flame 20, and the gas continues to pass from the opening 29 through the segmental port 22 into the chamber 13 until the parts approach the position represented in Fig. 7, so that the port 17 passes clear of the port 19 and the port 18 uncovers the port 8, so that the flame which has been contained in the chamber 13 now ignites the gases in the cylinder A through the port 8 and the explosion is rendered reliable, because the gases in the cylinder A are under pressure and expand from the port 8 into the chamber 13, that is filled with flame; and it is to be understood that the port 18 opens to the port 8 immediately after the crank E has passed the center on the upstroke, and the valve continues its motion in the direction of the arrow 32 until the port 18 coincides with the port 8, and then it immediately commences to move in the opposite direction, as indicated by the arrow 31, and these movements take place during the downstroke of the piston C, and the parts are so timed that the valve H is opened as the piston C commences to rise; hence the spent gases are ejected from the cylinder, and by the time the piston C reaches its extreme upward movement the valve L has continued to move in the direction of the arrow 31 until it approaches the position indicated in Fig. 6 to again admit air and gas by the ports 16 and 8 as soon as the piston C commences to descend.

I claim as my invention—

1. The combination, with the piston and cylinder having a port 8 in a gas-engine, of the circular valve-case having the ports 9 and 19 and the openings 29, 30, and 27, and a circular valve within the valve-case having the chambers 13 and 14 and the respective ports opening into such chambers, substantially as set forth.

2. The combination, with the valve-chest in a gas-engine, of a circular valve within the valve-chest, having a chamber 14, and ports through which air and gas are admitted to the engine, and a chamber 13 for containing gas that is ignited, ports leading to such chamber 13, for the admission of gas, and a port or opening leading from such flame-chamber to the cylinder-port, so that spent gases may be withdrawn from the flame-chamber into the cylinder of the engine, there being a port in the valve-chest to admit the flame from a burner to the flame-chamber of the valve, substantially as set forth.

Signed by me this 20th day of December, 1889.

SAMUEL LAWSON.

Witnesses:
GEO. T. PINCKNEY,
WILLIAM G. MOTT.